July 27, 1965     L. F. HAMPTON     3,196,918
SELF-LOCKING THREADED FASTENER
Filed July 16, 1964     3 Sheets-Sheet 1
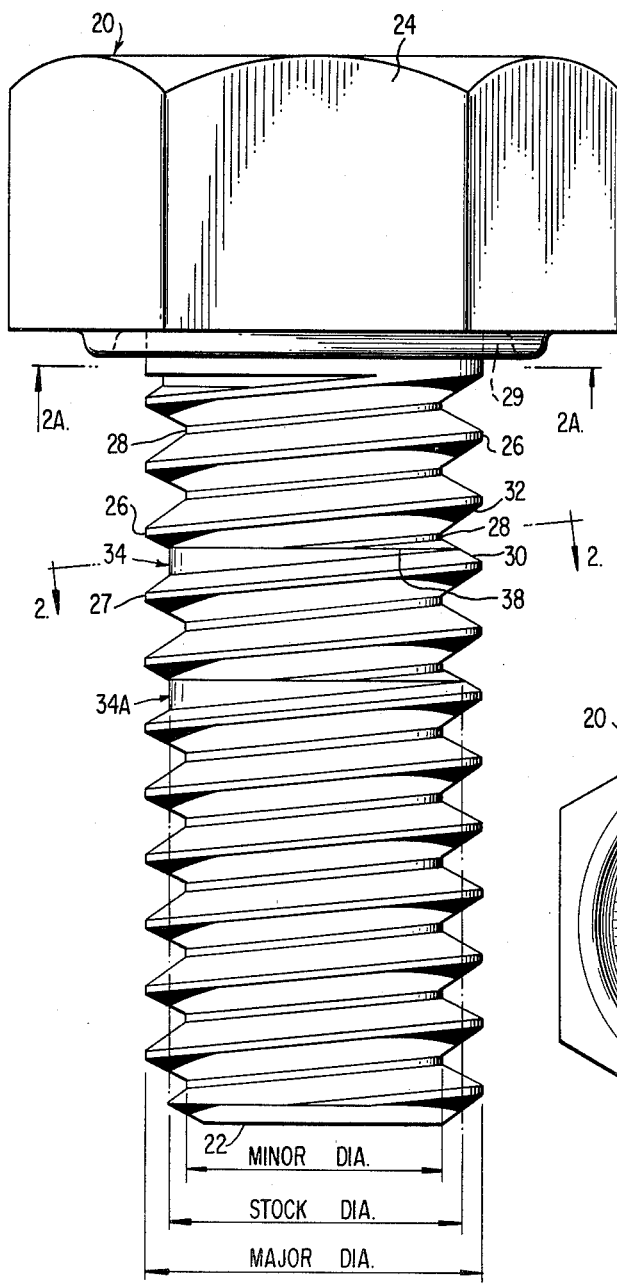
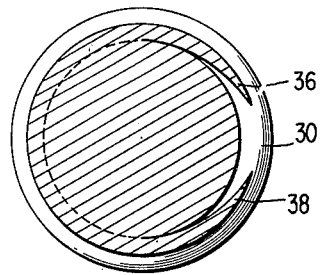
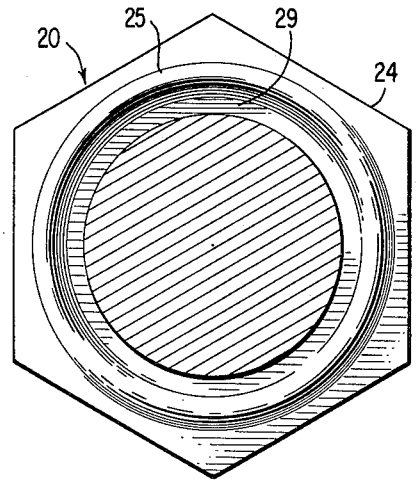
INVENTOR
LYNN F. HAMPTON
BY *LeBlanc & Shur*
ATTORNEYS July 27, 1965    L. F. HAMPTON    3,196,918
SELF-LOCKING THREADED FASTENER Filed July 16, 1964    3 Sheets-Sheet 2

INVENTOR.
LYNN F. HAMPTON
BY
*Schmieding and Fultz*
ATTORNEYS

July 27, 1965 L. F. HAMPTON 3,196,918
SELF-LOCKING THREADED FASTENER
Filed July 16, 1964 3 Sheets-Sheet 3

INVENTOR.
LYNN F. HAMPTON
BY
Schmieding and Fultz
ATTORNEYS

United States Patent Office 3,196,918
Patented July 27, 1965

3,196,918
SELF-LOCKING THREADED FASTENER
Lynn F. Hampton, Columbus, Ohio, assignor to Columbus Bolt & Forging Company, a division of Colorado Oil and Gas Corporation, Denver, Colo., a corporation of Delaware
Filed July 16, 1964, Ser. No. 383,114
4 Claims. (Cl. 151—22)

The present application is a continuation-in-part of my co-pending application Serial Number 49,267 filed August 12, 1960, entitled "Self-locking Threaded Fastener" which is now abandoned.

This invention relates to self-locking threaded fasteners and die apparatus for producing same.

It is well known that vibration, expansion and contraction and other forces and conditions of usage tend to cause threaded fasteners, such as screws and bolts, etc. to loosen from their set position. As a result, there have been numerous attempts to provide "self-locking" threaded fasteners like lock bolts, set screws, etc. Various approaches have been used including employment of oversize threads, interrupted thread(s), interference type locks, wedge type locks, eccentric threads, and other expedients. Few of these attempts have been fully satisfactory in varying conditions of use; and, in many instances, the expense of special manufacture has made the resulting lock bolt or set screw prohibitive for ordinary usage, particularly, for example, in mass production industries like the automobile industry.

Also, one of the particular shortcomings of prior lock bolts of the interference type has been the failure to provide an interfering thread which may be employed to mate "normal" or "standard" threads without damaging or deforming the mating thread, so that the lock bolt or screw may be used in installation where it must be removed and replaced several times, as in automobile transmission housings, engine blocks, automobile engine pans, etc. In particular, there has been a failure to achieve a self-locking threaded fastener which is removable and replaceable several times without material loss of securing and locking efficiency. Also, in large volume production, like the automobile and other major industries, the female and male threads of fasteners are made with tolerances for production purposes, and prior attempts at self locking threaded fasteners of the interference type have not provided a construction with a substantial range of adequate locking friction for various types of mating threads and thread fit classes for various uses when applied with standard tools or routine skills in the usual assembly line procedures.

It is a primary purpose of the present invention to provide a new improved self-locking threaded fastener which very effectively solves the aforementioned problems by use of a novel between-thread protrusion arrangement which smoothly deforms the threads of coacting elements (e.g. a nut or threaded aperture in a member), thus providing a superior resilient interference thread locking arrangement, which however does not deleteriously abuse the mating threads and permits removal and reuse of the self-locking threaded fastener of this invention.

In general the threaded fastener of the present invention includes an elongated shank portion provided with a plurality of thread convolutions forming spaced root portions and crest portions. A protruding portion for engagement with the crests on the threads of a coacting threaded element is formed between two adjacent convolutions with said protrusion having a configuration such that its radially outward extension progressively increases along a root portion and then progressively decreases along said root portion.

In accordance with the present invention it has been found that a thread interference protrusion of this configuration progressively engages and smoothly deforms the crests on the thread convolutions of a coacting threaded element such that the convolutions are effectively deformed into resilient locking engagement with the threaded element of the present invention.

As another aspect of the present invention a novel thread rolling die means is provided that serves to form the above described thread interference protrusion on a self-locking fastener constructed in accordance with the present invention.

It is therefore an object of the present invention to provide an improved self-locking threaded fastener that includes a thread interference protrusion of novel configuration and gradually and smoothly deforms and resiliently engages convolutions on a coacting threaded element.

It is a further object of the present invention to provide a preferred embodiment of the new improved self-locking threaded fastener incorporating a novel threaded interference protrusion arrangement on the threaded shank of the fastener with an annular projection below the fastener head and surrounding the fastener shank which is resiliently deformable to provide additional torque resistance against unlocking of the fastener which supplements the locking action of the interference protrusion of the threaded fastener per this invention, and also provides a desirable supplemental sealing action as hereinafter amplified.

It is another object of the present invention to provide a thread rolling die of novel construction for forming self-locking threaded fasteners in accordance with the present invention.

Further objects and advantages of the present invention will be apparent from the following description, reference being had to the accompanying drawings wherein a preferred form of embodiment of the invention is clearly shown.

In the drawings:

FIG. 1 is a side elevational view of a self-locking threaded fastener constructed in accordance with the present invention;

FIG. 2 is a sectional view of the shank of the fastener of FIG. 1, the section being taken along the centerline of one of the threads for approximately 360° at line 2—2 of FIG. 1;

FIG. 2A is a partial sectional view along the line 2A—2A in FIG. 1 showing the annular ring which extends downwardly from the head of the fastener and surrounding the fastener shank;

Figure 3:
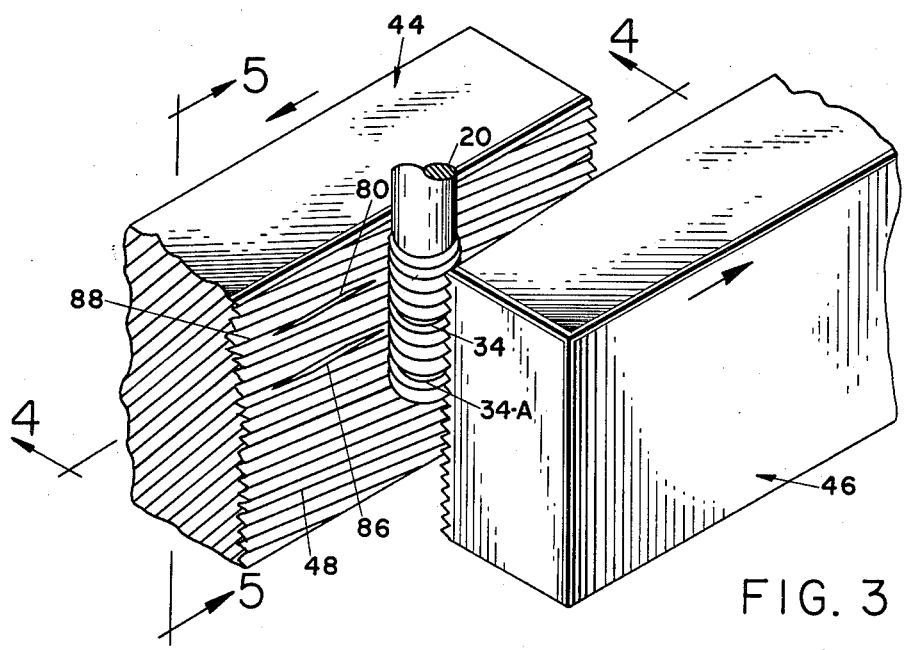
FIG. 3 is a partial perspective view of a thread rolling die constructed in accordance with the present invention.

Referring in detail to the drawings, a self-locking threaded fastener constructed in accordance with the present invention is indicated generally at 20 in FIGS. 1 and 2 and includes a shank portion 22 and a head portion 24.

Shank portion 22 includes a plurality of thread convolutions that form spaced crest portions, two of which are indicated at 26 and 27, located between spaced root portions 28. The root and crest portions are connected by flank portions, two of which are illustrated at 30 and 32.

With continued reference to FIGS. 1 and 2, a thread interference portion indicated generally at 34 is integrally formed between the two adjacent crest portions 26 and 27 and includes a leading arcuate end portion 36 and a trailing arcuate end portion 38.

As best seen in FIGS. 1 and 2, the outward extension of protrusion 34 from the adjacent thread flank portion progressively increases as protrusion 34 extends circumferentially around the shank of the screw from leading arcuate end portion 36 to a central arcuate portion 40 which provides a maximum thread interference portion; then the outward extension of protrusion 34 from the next adjacent thread flank portion begins to decrease (at a location indicated at 42 in FIG. 2) and continues to progressively decrease to the trailing end 38.

Fastener 20 can, if desired, be provided with additional thread interference protrusions of the configuration just described, one of said additional protrusions being indicated at 34-A in FIG. 1.

Figure 5:
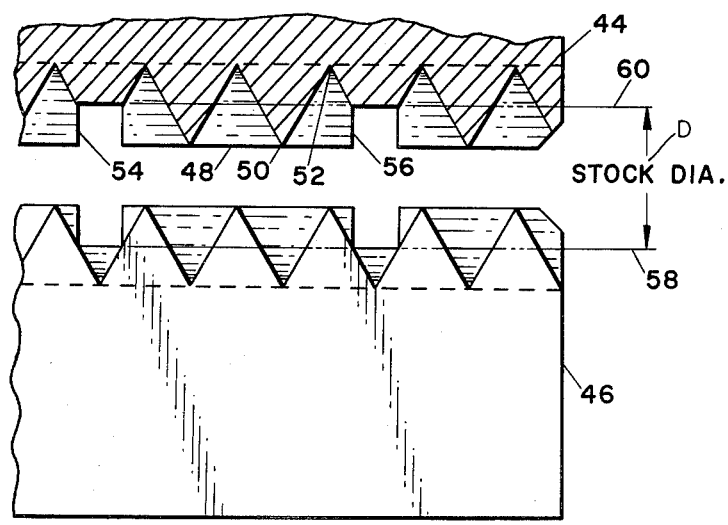
FIG. 5 is an end elevational view, partially in section of the die means of FIGS. 3 and 4, the section being taken along the line 5—5 of FIG. 3.
Figure 4:
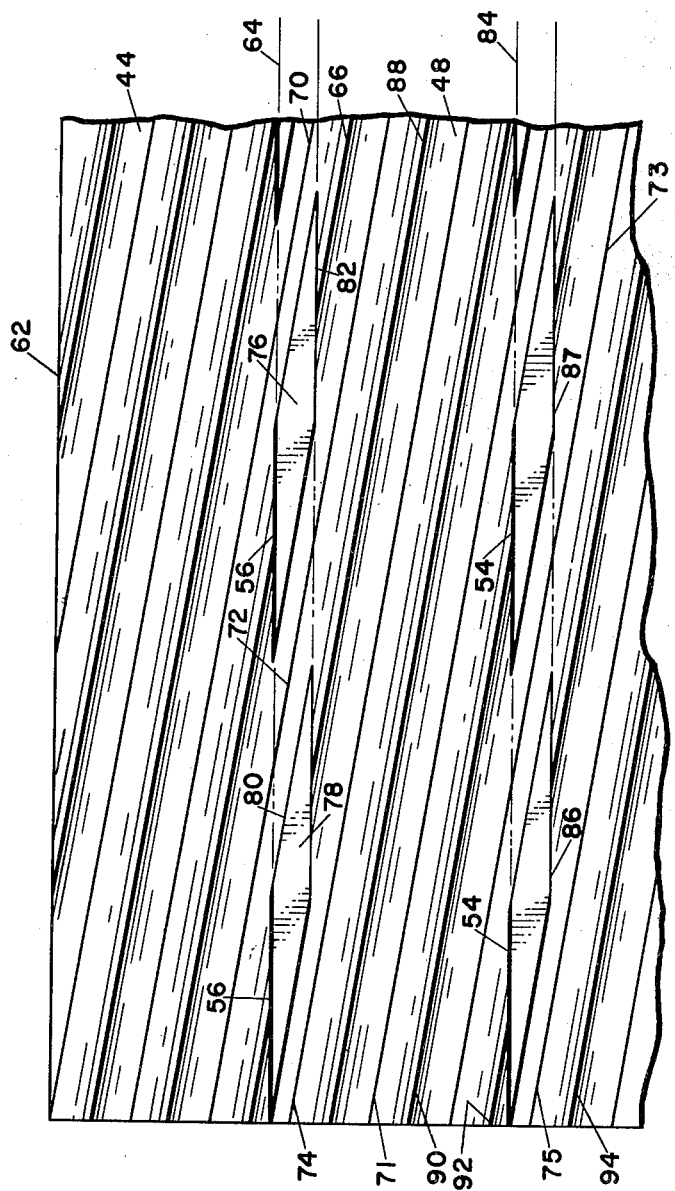
FIG. 4 is a partial plan view of a pressure applying surface of the die means of FIG. 3.

The nature of the new improved threaded lock fastener of this invention is further apparent from FIGS. 3–5 which illustrate a preferred novel thread rolling die construction for forming threaded fasteners of the type illustrated in FIGS. 1 and 2. The die includes relatively shiftable die members indicated generally at 44 and 56. Both of the die members include a face 48 provided with a plurality of crest portions 50 and root portions 52.

Longitudinally extending slots 54 and 56 are machined into the faces 48 of die members. The distance D between datum plane 58 and 60 lying along the bottom of the slots 54 and 56 is preferably established such that it is equal to the diameter of the bar stock from which the fasteners are formed. With this arrangement the slots 54 and 56 constitute longitudinally extending paths that extend across the die face 48 along which paths there is no rolling or deformation of the bar stock.

With reference to FIG. 5, longitudinally extending slots 54 and 56 actually appear in diamond shaped segments 80, 82, 86, and 87 since when a grinder is passed longitudinally along die face 48, in a direction parallel with upper edge 62, the path 64 of the grinding wheel will intersect, so far as the illustrated portion of the die face is concerned, only the crests 66 and 87 and the path 84 of the grinding wheel will intersect only the crests 90 and 92.

When the grinding wheel is moved along path 64 to form the depression 56 it will not engage the root portions 70, 72 and 74. Similarly, when the grinding wheel is moved along the path 84 to form the groove 54 it will not engage the root portions 71, 73 and 75. It will be understood that the maximum depth of grind will occur where the grinding wheel passes through the crests 66 and 68 and the crests 90 and 92. Where the grinding wheel passes through these crests the maximum depth of grind will occur at the central portions 76 and 78 of the diamond shaped segments 80 and 82.

In operation the bar stock is fed between the relatively shiftable thread rolling die members 44 and 46 whereby the bar stock is caused to roll along faces 48 of the die members. The crests on the die members, such as crests 66 and 88, which are intersected by the ground groove 56 form a root section provided with a protrusion such as is seen at 34 in FIGS. 1 and 3. The crests that are intersected by the groove 54, which is intersected by the diamond shaped segments 86 and 87, form a root section and a corresponding protrusion such as is seen at 34-A in FIGS. 1 and 3. As the bar stock progresses along the die faces 48 of die sections 44 and 46 the protrusions 34 and 34-A will roll into the successive ground diamond shaped sections lying along the paths 64 and 84 of the grinding wheel.

In fabricating bolts in accordance with the present invention it has been found that efficient thread interference is obtained when the stock diameter is equal to the pitch diameter of the thread such that the unrolled portions forming the thread interference protrusions 34 and 34-A protrude outwardly from the minor or root diameter for a distance equal to approximately one-half of the distance between the root portions and the crest portions of the thread. This is achieved by establishing the depth of grooves 54 and 56, FIG. 5, so as to equal one-half the depth of the root portion 52 relative to the die face 48, seen in FIG. 5, and by establishing the distance between the confronting die faces 48 so that the distance between the datum planes 58 and 60 lying along the bottoms of the grooves 54 and 56 is equal to the diameter of the bar stock. This is best illustrated in FIG. 5.

As will be apparent from the foregoing discussion, when self-locking bolts 20 of FIGS. 1 and 2 are made with the die arrangement of FIGS. 3–5, the threaded self-locking fastener 20 per this invention has on shank portion 22 a plurality of threaded convolutions having longitudinally spaced crest portions 26 and root portions 28, with at least one protruding locking portion 34 (or 34-A) disposed between two adjacent thread crest portions and circumferentially extending along an intermediate root portion. The protruding locking portion 34 (or 34-A) includes a first arcuate portion extending from one of two confronting sides of two adjacent thread crest portions, plus a second arcuate portion extending from flank to flank of adjacent threads intermediate the root and crest of the same, and a third arcuate portion extending from the other opposite confronting side of the aforementioned two adjacent thread crest portions; with the aforesaid first arcuate portion extending from one end of the aforesaid second arcuate portion, and the aforesaid third arcuate portion extending from the other end of the second arcuate portion. The protruding locking portion 34 (or 34-A) has a substantially uniform radial extent, which in the preferred embodiment is approximately one-half the radial distance between the thread root and thread crest. However, as will be apparent to those skilled in the art, the maximum radial extent of the protruding portion 34 (or 34-A) need not be precisely uniform, while still utilizing the features of the present invention; referring to FIG. 4, this would occur, for example, if segments 78, 76, 86 and 87 cut slightly concave in the face of die 62. As will be apparent each of the aforesaid first and third arcuate portions of the protruding lock portion 34 (or 34-A) has a radially extending surface facing the confronting thread flank, with said radial extending surface extending transverse to the axis of the fastener shank 22. The protruding lock portion 34 or 34-A (including the aforesaid first, second and third arcuate portions) should arcuately extend about the circumference of the shank of threaded fastener 20 for at least in the order of 90 degrees; this will be apparent from comparing the protrusion forming ground segments 76 and 78 (and 86 and 87) with the thread forming portions of die 62 in FIGS. 3 and 5, with reference to the fastener shown in FIGS. 1 and 2.

If the threaded fastener is made with two thread locking protrusions such as illustrated at 34 and 34-A in FIG. 1, the two thread locking protrusions preferably should be longitudinally (axially) spaced at least about 4 threads apart. Also, for more efficient locking action the two axially spaced thread (portions) lock protrusions preferably should have an arcuate length in excess of 180 degrees extending circumferentially about the threaded shank; and the midpoint of each of the two arcuate protrusions should be angularly spaced from each other approximately 180 degrees around the threaded shank circumference. (That is, the mid-points of the two axially spaced locking protrusions are preferably on opposite sides of the fastener shank, arcuately spaced approximately 180 degrees apart.)

In preferred embodiments of self-locking threaded fasteners utilizing the novel locking protrusion (e.g. 34) of this invention, the thread locking protrusion nearest the under side of the fastener head 24 should be spaced from the head underside at least 3 times the pitch of the thread. Also, the thread locking protrusion nearest the entry end of the fastener (e.g. 34-A in FIG. 1) should be spaced from the end of the fastener a distance of at least 4 times the pitch of the thread.

The above-described construction of the present invention provides a highly effective thread locking fastener, with the disclosed novel protrusion arrangement smoothly deforming the normal or standard threads of a cooperating element such as a nut or other threaded aperture, thereby achieving an interference locking arrangement which does not abuse the cooperating threads and thus permits removal and reuse of the self-locking threaded fastener, even several times. Also, the novel thread locking fastener of this invention may be readily modified to provide variations in self-locking torque force by lengthening or shortening the arcuate extent of the locking protrusion (34 or 34–A); that can be readily done by modifying the length of the cut segment in the rolling die (76, 78, 86, 87) in FIG. 4. Further, it has been found that the self-locking protrusion (34 or 34–A) provides a quite effective sealing action which prevents leakage of oil or other liquid through the threaded aperture in which self-locking fastener 20 is installed (e.g., to retain the engine block pan of an automobile).

As is apparent from FIGS. 1 and 1A, the under side of the bolt head 24 is also provided with a downwardly extending annular ring 25 forming an annular recess 29 surrounding part of shank 22 of the fastener 20. When lock bolt 20 is tightened so that the annular ring 25 bears against part of a member in which the bolt is inserted (e.g. in securing the head of an automobile engine block), the resilient ring 25 is deformed and provides additional torque resistance which supplements the locking action of the locking protrusion 34 (or 34–A). Thus, when the annular ring 25 is incorporated in self-locking fastener 20, a higher torque may be applied to distort the ring 25, whereby a higher torque is required to displace and remove the lock bolt 20 than if the ring 25 were omitted. Accordingly, when the ring 25 is incorporated, the bolt 20 must be angularly displaced a sufficient amount to remove the torque imposed by distortion of ring 25, and then the locking protrusion 34 (or 34–A) will hold the bolt, whereas previously the action of locking portion 34 (or 34–A) was supplemented by that of ring 25. However, as will be apparent, annular ring 25 may be omitted, and the locking portion 34 (or 34–A) will itself retain fastener. Also, when ring 25 is deformed by being tightened, that action forms an annular seal around the fastener shank 22 which helps prevent leakage of oil or other liquid (as in the mounting of an automobile engine pan) thereby supplementing the sealing action of the locking protrusion 34 (or 34–A).

It will be apparent from the foregoing that the present invention provides a new improved self-locking threaded fastener which may be made at competitive prices in high volume production with relatively simple modification of existing type equipment; and that the present invention achieves the objects and advantages previously discussed in this application.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A self-locking threaded fastener comprising: a plurality of thread convolutions forming longitudinally spaced crest portions and root portions; a protruding portion between two adjacent thread crest portions and extending circumferentially along an intermediate root portion, said protruding portion including a first arcuate portion extending from only one of two confronting sides of two adjacent thread crest portions, a second arcuate portion extending from flank to flank of adjacent threads intermediate the root and crest thereof, and a third arcuate portion extending from only the other of said confronting sides of said two adjacent thread crest portions; said first arcuate portion extending from one end of the second arcuate portion and the third arcuate portion extending from the other end of said second arcuate portion; said protruding portion having a substantially uniform maximum radial extent; said first, second and third arcuate portions together extending circumferentially at least in the order of 90 degrees; said first and third arcuate portions each having a radially extending surface facing the confronting thread flank which surface extends transverse to the axis of the fastener.

2. A self-locking threaded fastener as defined in claim 1, wherein said protruding portion extends radially outward from the thread root portion approximately one half the radial distance between the thread root and thread crest.

3. A self-locking threaded fastener as defined in claim 1 comprising two of said protruding portions disposed between two sets of adjacent thread crest portions and axially spaced at least four threads apart.

4. A self-locking threaded fastener having a head and shank extending therefrom with a plurality of thread convolutions and at least one protruding portion between two adjacent thread portions as defined in claim 1, and further comprising an annular ring extending from the underside of said head spaced from and surrounding a portion of said fastener shank.

No references cited.

EDWARD C. ALLEN, *Primary Examiner.*

UNITED STATES PATENT OFFICE
CERTIFICATE OF CORRECTION

Patent No. 3,196,918 July 27, 1965

Lynn F. Hampton

It is hereby certified that error appears in the above numbered patent requiring correction and that the said Letters Patent should read as corrected below.

Column 3, line 59, after "section" insert -- 28 --.

Signed and sealed this 26th day of April 1966.

(SEAL)
Attest:

ERNEST W. SWIDER
Attesting Officer

EDWARD J. BRENNER
Commissioner of Patents